United States Patent [19]

Yamamoto et al.

[11] Patent Number: 5,688,836
[45] Date of Patent: Nov. 18, 1997

[54] POLYTETRAFLUOROETHYLENE POROUS MATERIAL AND PROCESS FOR PRODUCTION OF THE SAME

[75] Inventors: Katsutoshi Yamamoto; Osamu Tanaka; Hirofumi Onogi, all of Osaka, Japan

[73] Assignee: Daikin Industries, Ltd., Osaka, Japan

[21] Appl. No.: 211,056

[22] PCT Filed: Jul. 27, 1993

[86] PCT No.: PCT/JP93/01051

§ 371 Date: Mar. 25, 1994

§ 102(e) Date: Mar. 25, 1994

[87] PCT Pub. No.: WO94/03531

PCT Pub. Date: Feb. 17, 1994

[30] Foreign Application Priority Data

Jul. 30, 1992 [JP] Japan .................. 4-203552

[51] Int. Cl.$^6$ ........................ C08J 9/24
[52] U.S. Cl. .............. 521/145; 521/54; 521/59; 521/134; 264/127; 264/154; 264/288.8
[58] Field of Search .................. 264/127, 154, 264/288.8; 521/54, 134, 145, 59

[56] References Cited

U.S. PATENT DOCUMENTS

| | | | |
|---|---|---|---|
| 4,096,227 | 6/1978 | Gore | 264/127 |
| 4,882,113 | 11/1989 | Tu et al. | 264/127 |
| 4,891,407 | 1/1990 | Mitchell | 524/506 |
| 4,973,609 | 11/1990 | Browne | 521/145 |

FOREIGN PATENT DOCUMENTS

| | | |
|---|---|---|
| 0256748 | 2/1988 | European Pat. Off. . |
| 0433787 | 6/1991 | European Pat. Off. . |

*Primary Examiner*—John M. Cooney, Jr.
*Attorney, Agent, or Firm*—Birch, Stewart, Kolasch & Birch, LLP

[57] ABSTRACT

There is provided a polytetrafluoroethylene (PTFE) porous material which has improved adhesion and improved buckling resistance on bending without a tearing problem along a tubular axial direction.

The porous material is composed of a polytetrafluoroethylene and a heat-meltable resin of which melting point is lower than that of the polytetrafluoroethylene, has fibril portions and node portions and characterized in that the fibril portions are mainly of the polytetrafluoroethylene, and the heat-meltable resin mainly constitutes the node portions and hardly constitutes the fibril portions.

The porous material is produced by extruding powder for paste-extrusion, which comprises particles of the polytetrafluoroethylene produced by emulsion polymerization of tetrafluoroethylene and particles of the heat-meltable resin of which melting point is lower than that of the polytetrafluoroethylene, at a temperature which is not higher than the melting point of the heat-meltable resin optionally followed by rolling so that an unsintered material is obtained, stretching the unsintered material at a temperature which is not higher than the melting point of the heat-meltable resin, and then heat setting the stretched material at a temperature which is equal to or higher than the melting point of the polytetrafluoroethylene.

8 Claims, 4 Drawing Sheets

POLYTETRAFLUOROETHYLENE POROUS MATERIAL AND PROCESS FOR PRODUCTION OF THE SAME (TECHNICAL FIELD)

The present invention relates to a polytetrafluoroethylene (which is, hereinafter, also referred to as "PTFE") porous material having improved properties, especially buckling resistance on bending and adhesion, and a process for the production of such a material.

(BACKGROUND ART)

A PTFE porous material has been used as for a number of medical treatments, especially for tubes of the medical treatments such as an artificial blood vessel since it has inherent properties such as excellent chemical resistance and heat resistance, its friction factor is small and further it is porous.

However, the tube made of the PTFE material has problems of buckling (collapse) on bending and also tearing along its longitudinal axial direction. In order to solve such problems, Japanese Patent Kokai Publication Nos. 49-22792, 50-102673 and 55-90347 disclose tape or fiber wrapping around the PTFE porous tube.

Alternatively, in order to overcome the above problems with respect to the PTFE porous tube, Japanese Patent Kokai Publication No. 55-52754 discloses application of a porous elastomer coating around the tube.

Since any solution as described above should further treat the PTFE tube, namely, it requires a further processing, it is not an economically advantageous solution. In addition, since such a solution does not change the properties of the PTFE tube itself, it highly depends on properties of the tape and the fiber, so that it is not always preferred.

Japanese Patent Kokai Publication No. 61-143124 discloses a method in which PTFE tubes which have been heat set are connected together by providing a separate heat fusible resin layer between them. When the PTFE tubes are connected by such a method, there occurs a problem that porosity of a portion where the connection is formed is not available.

The PTFE material is used as an insulation of an electric cable since it has an excellent electric insulating property in addition to the properties as described above. When the PTFE porous material is used as the cable insulation material, especially in the production of a flat cable, an adhesive is used so as to bond together the PTFE porous materials or an unsintered PTFE porous materials are heated to a temperature above their melting points so as to fuse the PTFE materials. However, the method using the adhesive is not satisfactory in the electrical properties and the heat resistance.

Japanese Patent Kokai Publication No. 56-149712 discloses a process for the production of a flat cable in which a plurality of conductors are sandwiched between unsintered PTFE porous films to form a resulted composite and then the resulted composite is pressed at a temperature above a melting point of the PTFE films. This process is based on an idea that the two sheets of the film are not bonded together unless the unsintered two sheets of the porous film are sintered while pressed. In such a process, the unsintered composite is less strong and change in its dimensions is large, so that a special apparatus is required in which such issues are taken into account.

Particularly, the flat cable is required to have flexibility. When the cable changes in its dimensions on bending thereof, especially when a large change in dimensions such as buckling occurs, electrical properties of the cable such as an impedance thereof is greatly changed in a portion where the dimension change occurs, which would cause a problem.

In order to prevent such change in dimensions, Japanese Patent Kokai Publication No. 57-7023 discloses a solution for such a problem in which a plastic layer is provided on an outer surface of a PTFE layer so that the change in dimensions and also the change in the electrical properties are prevented.

However, such a solution does not allow to increase a thickness of the plastic layer at the expense of the flexibility of the PTFE layer. Therefore, there is the problem that no change due to a stress from the outside is available.

(DISCLOSURE OF THE INVENTION)

As described above, it is difficult to adhere or bond the PTFE porous material. In addition, the tubular article of the PTFE material has the problems of buckling and tearing along its axial direction, and the film (or the tape) article of the PTFE material has the problem of change in dimensions. Although there have been suggested a number of solutions to overcome those problems, no solution is satisfactory. It is desirable to overcome those problems and, in addition, to provide a PTFE material having further improved properties besides the properties as described above. Thus, it is an object of the present invention to overcome the problems and also to provide such an improved PTFE material.

It has been found that the above object is achieved by a polytetrafluoroethylene porous material composed of a polytetrafluoroethylene (PTFE) and a heat-meltable resin of which the melting point is lower than that of the polytetrafluoroethylene, which material has fibril portions and node portions characterized in that the fibril portions are mainly of the polytetrafluoroethylene, and the heat-meltable resin mainly constitutes the node portions and hardly constitutes the fibril portions.

The polytetrafluoroethylene porous material according to the present invention is produced by extruding powder for paste-extrusion, which comprises particles of a polytetrafluoroethylene produced by emulsion polymerization of tetrafluorothylene and particles of a heat-meltable resin of which melting point is lower than that of the polytetrafluoroethylene, at a temperature which is not higher than the melting point of the heat-meltable resin and optionally rolling after extruding, so that an unsintered material is obtained, stretching the unsintered material at a temperature which is not higher than the melting point of the heat-meltable resin, and then heat setting the stretched material at a temperature which is equal to or higher than the melting point of the polytetrafluoroethylene.

In the present invention, a melting point of a PTFE is intended to mean a melting point of an unsintered PTFE.

The material produced by the above process is the polytetrafluoroethylene porous material according to the present invention, which is defined as above on the basis of ideas which will be described below.

3

Figure 4:
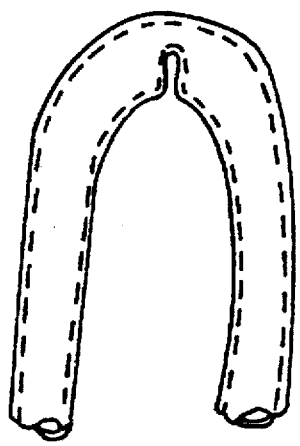
Figure 5:
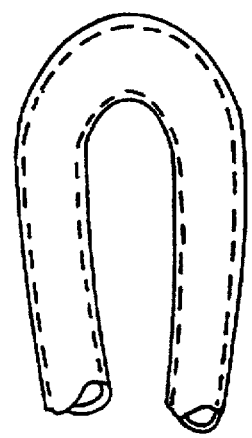
Figure 6:
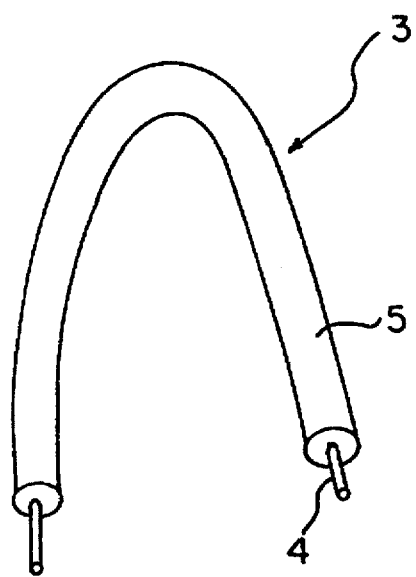
Figure 7A:
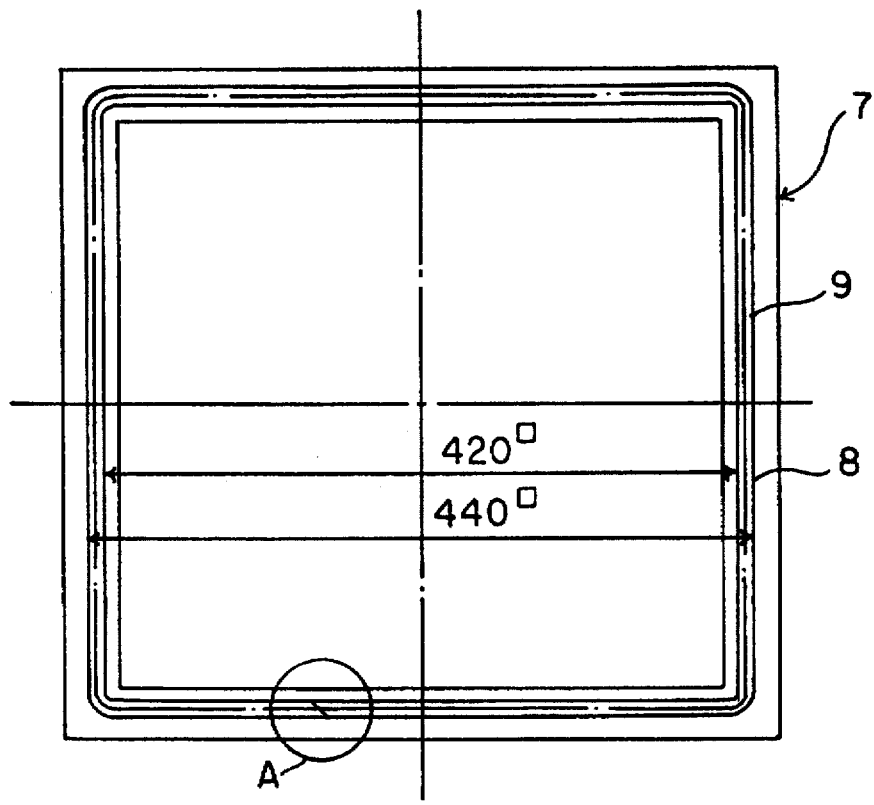
Figure 7B:
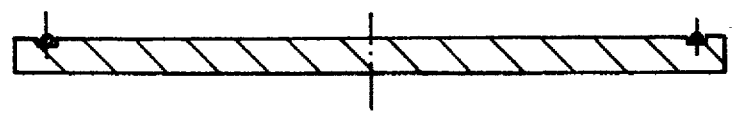
Figure 8:
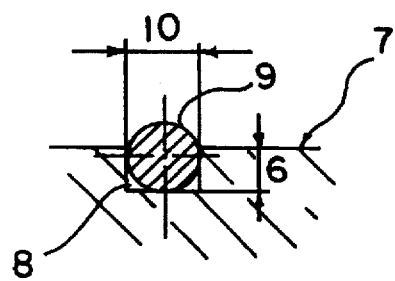

FIG. 4 schematically shows a tube of the prior art PTFE porous material when it is bent;

FIG. 5 schematically shows a tube of a PTFE porous material according to the present invention when it is bent;

FIG. 6 schematically shows a cable in which a rod article of a PTFE porous material according to the present invention is used as an insulation;

FIG. 7A schematically shows a plane view in combination with FIG. 7B showing a cross-sectional view of a door of a hot-air oven to which a rod of a PTFE porous material according to the present invention is applied; and FIG. 8 schematically shows partially enlarged portion of the cross-sectional view of FIG. 7.

In the drawings, the reference numeral 1 indicates a node portion, the numeral 2 does a fibril portion, the numeral 3 does a communication cable, the numeral 4 does a conductor, the numeral 5 does an insulation, the numeral 7 does an open-close door, the numeral 8 does a groove portion, and the numeral 9 does a rod.

(DETAILED DESCRIPTION OF THE INVENTION)

Figure 3:
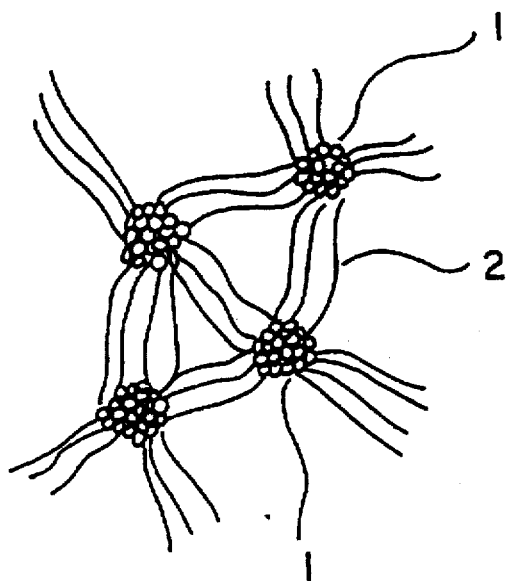
FIG. 3 schematically shows an enlarged PTFE porous material of the prior art.

Generally, a polytetrafluoroethylene porous material is produced by paste-extruding polytetrafluoroethylene fine powder and optionally further rolling after extruding so that an unsintered material is obtained, and then stretching the unsintered material followed by sintering thereof. The polytetrafluoroethylene porous material, in such production, is composed of fibril portions 2 (fibrous portions) and node portions 1 (knot portions) as shown in FIG. 3 in an enlarged view, which has been known from, for example, Japanese Patent Kokai Publication No. 46-7284.

Figure 1:
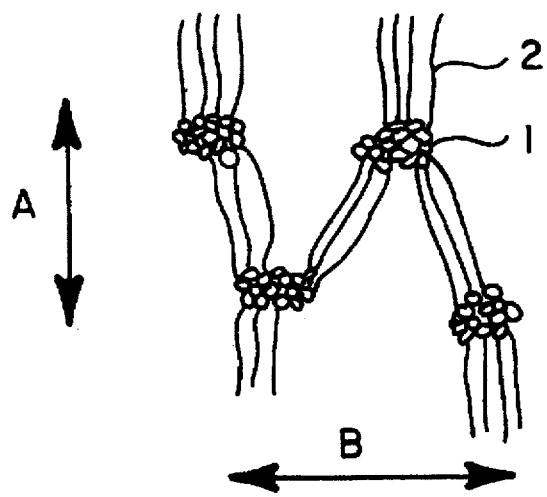
FIG. 1 schematically shows an enlarged PTFE porous material according to the present invention before heat setting.

In the present invention, it is contemplated that the polytetrafluoroethylene constitutes both of the fibril portions and the node portions since the unsintered material is firstly produced which is then extruded and/or rolled so that the fibril portions are readily formed. However, the particles of the heat meltable resin is rigid even though the resin has not been subjected to a fusion treatment after polymerization, so that no fiber is generated from the particles. Thus, at a temperature below its melting point, the heat-meltable resin does not constitute the fibril portions when extruded, so that the resin is left only in the node portions. When the material in such a condition is stretched at a temperature which is not higher than the melting point of the heat-meltable resin, the structure of the material is obtained as schematically and enlarged shown in FIG. 1. That is, the heat-meltable resin remains in a aggregate construction in which individual particles are present independently in the node portions.

Figure 2:
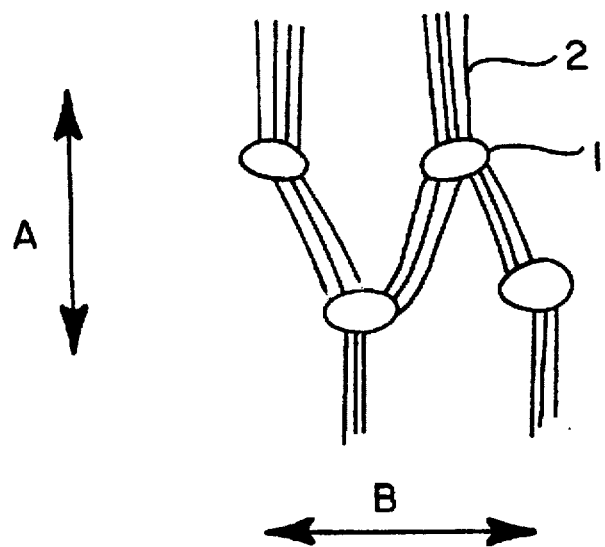
FIG. 2 schematically shows an enlarged PTFE porous material according to the present invention after heat setting.

Then, when such a material is heat set at a temperature above the melting point of the polytetrafluoroethylene (thus,. also above the melting point of the heat-meltable resin), the heat-meltable resin becomes completely integral in the node portions with the polytetrafluoroethylene which is present in the node portions 1 as shown in FIG. 2.

Therefore, the heat-meltable resin hardly contributes to the formation of the fibril portions 2, and the fibril portions mainly comprises the polytetrafluoroethylene. The node portions comprises the heat-meltable resin and the polytetrafluoroethylene which does not contribute to the formation of the fibril portions.

In the process for the production of the PTFE porous material according to the present invention, the polytetrafluoroethylene (PTFE) includes not only a homopolymer of a polytetrafluoroethylene but also a copolymer with other monomer which can be copolymerized with tetrafluoroethylene, which copolymer is able to be paste-extruded and stretched so that the fibril portions and the node portions are formed.

The PTFE is so-called fine powder preferably (having an average particle diameter of about 0.1 to 0.5 μm) produced by the emulsion polymerization. A molecular weight of the PTFE fine powder is selected depending on, for example, a pore size of the porous material to be produced, and generally the polytetrafluoroethylene having a molecular weight in a range of about three million to ten million is used.

The heat-meltable resin used in the present invention has a melting point which is lower than that of the PTFE. This is because the particles of the heat-meltable resin should be melted to become integral during the heat-setting treatment. The heat-meltable resin should have heat resistance to such an extent that it does not decompose and/or not foam during the heat setting treatment. From this view point, a polyethylene, a polypropylene and the like are not preferred.

Concretely, tetrafluoroethylene-hexafluoropropylene copolymer (FEP), tetrafluoroethylene-perfluoroalkyl vinyl ether copolymer (PFA), poly (ether ether ketone) (PEEK) and the like are specifically preferred examples as the heat-meltable resin. Those heat-meltable resins preferably have an average particle diameter of 0.1 to 50 μm which is attributed to the emulsion polymerization or grinding.

A content of the heat-meltable resin in the PTFE can be selected depending on, for example, a pore size of an intended porous material. The content is not specifically limited, but generally in a range of 25 to 75% by weight, and preferably 40 to 60% by weight.

In the production of the PTFE porous material according to the present invention, for example, the unsintered material which is produced by extruding the powder in which the particles of the emulsion polymerized tetrafluoroethylene and the particles of the heat-meltable resin are uniformly mixed and optionally by rolling thereafter is produced in the following procedures.

An aqueous dispersion produced from the emulsion polymerization of tetrafluoroethylene (containing PTFE particles which have an average diameter of 0.2 to 0.3 μm) is intimately mixed with an aqueous dispersion comprising the heat-meltable resin particles having a predetermined size (for example, an average diameter of about 0.1 to 50 μm) followed by a suitable treatment such as mixing with dropping nitric acid so as to coagulate the particles. Then, an aqueous phase is removed and the coagulated particles are dried so as to obtain powder for paste-extruding. A suitable shaping-aid (for example, solvent naphtha, white oil and the like) is uniformly mixed with the powder to obtain a preform. In this case, an amount of the shaping-aid used is generally 20 to 25 parts by weight based on 100 parts by weight of the powder.

The resulted preform is charged in a cylinder of a paste-extruder and extruded with a ram and optionally rolled thereafter along the same direction as an extrusion direction using pressure rolls. Then, the shaping-aid is removed in a suitable manner (for example, drying and/or extraction) so that the unsintered (namely, non-heat setting treated) material is obtained. These procedures for the production of the unsintered material are substantially the same as those for the production of an extrudate or a rolled material of the polytetrafluoroethylene paste powder which is generally known.

Then, the unsintered material is mono-axially stretched along a direction which is the same as or perpendicular to the extrusion or rolling direction at a temperature which is lower than the melting point of the heat-meltable resin. Such stretching can be carried out in a stretching manner which is generally known. For example, stretching is performed in a space between rolls each having a different rotational speed or a tenter in an oven. The porosity of the PTFE material according to the present invention is provided during the stretching treatment.

The material thus stretched has the porosity at the end of stretching. The material is strong along the stretching direction (the direction shown by an arrow A in FIG. 1) so that it is resistant to a tensile force along the stretching direction. To the contrary, the material is not so strong along a direction perpendicular to the stretching direction (the direction shown by an arrow B in FIG. 1) and it is likely to be torn as in the prior art PTFE porous material. This is because the fibril portions are strong against the tensile force along the stretching direction, while resistance of the node portions against the tensile force perpendicular to the stretching direction, which depends on knots of the fibril portions and a cohesion force of the heat-meltable resin particles, is not so large.

After stretching, the resulted PTFE porous material is heat set (sintered) at a temperature which is higher, preferably by 10° to 50° C., than the melting point of the PTFE, whereby the PTFE porous material is obtained which does not cause change in dimensions and also which has improved mechanical strength. Since the heat setting renders the heat-meltable resin and the polytetrafluoroethylene integral together in the node portions, the mechanical strength of the node portions is remarkably improved. Therefore, when compared with the prior art PTFE porous material, the strength is relatively improved along the direction perpendicular to the stretching direction (the direction shown by an arrow B in FIG. 2), so that the tearing problem is overcome. In the case where the PTFE material is made into the tubular or film article, the change in dimensions such as a buckling problem on bending thereof is also overcome.

In addition, since the porous material according to the present invention includes the heat-meltable resin, such a porous material is easily bonded to itself or other porous material at a temperature above the melting point of the heat-meltable resin, which also solves the prior art problem.

INDUSTRIAL APPLICABILITY

Where the porous material according to the present invention is formed into the tubular article, the article has the good buckling resistance on bending. Though the tube made of the prior art PTFE porous material is readily buckles as schematically shown in FIG. 4, the tube made of the porous material according to the present invention does not buckle as schematically shown in FIG. 5 when it is bent around a circle having the same radius as in FIG. 4.

Thus, the present tube is convenient for the application in which buckling is undesired in, for example, a medical treatment field as a blood vessel, a tube for an artificial organ and a guiding tube of an endoscope. Alteratively, the tube is also useful for a diffuser which supplies a fluid in a liquid, a separation tube of an exhaust gas sensor of an automotive which removes droplets and dusts and the like.

In the case where the porous material according to the present invention is formed into a film article, change in dimensions is small which typically corresponds to change in thickness of the article when it is bent, and it is, thus, conveniently used for an insulating layer of a flat cable. When an end of the flat cable is connected to a terminal, an insulating layer at a cable end should be stripped off from the cable. In such a case, the insulating material is not torn along its longitudinal direction of the cable provided that the stretching direction of the material corresponds to an axial direction of the cable. Thus, there is provided another advantage that stripping of the insulating layer becomes greatly easy.

Since the porous material according to the present invention is excellent in its bonding properties, it is possible to laminate or to bond together the materials without using any adhesive or other heat-meltable resin layer.

In addition, where the porous material according to the present invention is formed into a solid (rod) article, it has been also found that the article has large compressive strength along a direction perpendicular to the extrusion direction, excellent flexibility and small change in dimensions when bent.

Thus, when the porous material according to the present invention is used for the cable insulation, change in a specific impedance can be made small. As a result, the material can be conveniently used as an insulation 5 of a conductor 4 of a communication cable 3 which can be bent without buckling as schematically shown in FIG. 6. Further, a plurality of such insulated cables are bonded together into a bundle or into a parallel arrangement by thermal fusing.

A rod made of the porous material according to the present invention is also useful as a sealing member especially for a low pressure gas or a non-permeable liquid. Since the sealing member according to the present invention has the excellent flexibility and the large compressive strength as described above, such a member is not only easy to handle but also causes no problem of partial depression thereof. For example, when the sealing member is located in place, no depression occurs at only a portion where a force is applied and near such a portion.

The sealing member according to the present invention provides a sealing effect within its elastomeric deformation without collapsing the porous structure thereof, which is quite different from the prior art sealing material which provides a sealing effect with collapsing the porous structure.

(EXAMPLE)

Example 1

An aqueous dispersion of emulsion polymerized PTFE (melting point 345° C., average particle diameter 0.3 µm, average molecular weight 5,500,00G) and an aqueous dispersion of emulsion polymerized PFA (melting point 310° C., average particle diameter 0.2 µm) were mixed in a weight ratio (PTFE : PFA) of (1:1), and then a small amount of nitric acid was added to the mixture while stirred, whereby the polymer particles were coagulated. Then, the coagulated particles were separated and then dried so that powder for paste-extrusion was obtained.

Then, as a shaping-aid, 23 parts by weight of Isopar E (a petroleum solvent commercially available from Exxon Co.) was mixed with 100 parts by weight of the resulted powder for the paste-extrusion, which mixture was extruded in a draw ratio of 230:1 to form a tube having an outer diameter of 5 mm and an inner diameter of 4 mm. Thereafter, the tube was dried in an oven at a temperature of 150° C. to remove the shaping-aid.

The dried tube was stretched by five times at a rate of 500%/sec. in an oven heated to 300° C. to have an unsintered porous tube. When the tube was bent, it buckled as shown in FIG. 4.

Then, the unsintered porous tube was heat set for five minutes in an oven heated to 350° C. A void fraction of the porous material was calculated to be about 85% on the basis of the dimensions and the weight of the porous material. As shown in FIG. 5, the resulted tube did not buckle when it was bent.

Comparative Example 1

Example 1 was repeated except that PFA was not blended so that a PTFE tubular porous article was produced. When the resulted tube was bent as in Example 1, buckling occurred as shown in FIG. 4.

Example 2

Powder for extrusion was prepared as in Example 1. 24 Parts by weight of Isopar M was blended with 100 parts by weight of the powder, which blend was paste-extruded, rolled and dried to obtain an unsintered tape having a width of 200 mm and a thickness of 100 μm. Subsequently, the tape was stretched by four times using two pairs of rolls at a temperature of 300° C. (a stretching rate was 100%/sec.), whereby a porous tape was obtained. Then, the tape was cut and heat set for five minutes in an oven at a temperature of 360° C. while both ends of the cut tape were fixed so as to prevent its shrinkage.

In order to examine heat fusible adhesion of the resulted tape, the tape was sandwiched between two planar aluminum plate having a thickness of 1.5 mm. Facing ends (a separation between the ends of the plate was 7 cm) of the plates were clamped with pressed using clips, which was heated in an oven at a temperature of 360° C. for 10 minutes followed by subjecting a peeling test at 180°.

A force required to peel off the two sheets of the films (having a width of 2 cm) from each other was 500 g (at a rate of 200 mm/min.).

Comparative Example 2

A porous tape was produced by repeating Example 2 except that PFA was not blended. The peeling test was carried out as in Example 2, and the force required to peel off was 200 g.

It is seen from the results of Example 2 and Comparative Example 2 that the porous tape according to the present invention is superior also in its adhesion ability.

Example 3

Powder for paste-extrusion was prepared as in Example 1.23 Parts by weight of Isopar E as a shaping-aid was blended with 100 parts by weight of the powder, and the resulted blend was extruded through a cylinder having a diameter of 30 mm to form a rod having a diameter of 5 mm. The rod was dried so as to remove the shaping-aid.

The produced rod was stretched by six times at a stretching rate of 200%/sec.

Then, the stretched rod was heat set in an oven at a temperature of 360° C. for 5 minutes while each end of the rod was fixed.

Comparative Example 3

A rod was formed by repeating Example 3 except that PFA was not blended.

The rods produced in Example 3 and Comparative Example 3 were tested with respect to buckling property (whether or not buckling occurs when the rod is bent so as to form an arc of its diameter (5 mm)), tearing property (whether or not the tape is continuously torn when a split is formed across the center of a rod at its end perpendicular to a stretching direction using a knife and then the split is opened), and a size of depression when a force of 100 g is applied to a length of 5 mm of a rod as an applied surface (deformation is referred to as "LARGE" in a case where an extent of the deformation is above 50% of a diameter of the rod, and deformation is referred to as "SMALL" in a case where an extent of the deformation is below 20% of a diameter of the rod). The results of the tests are shown in the below Table 1.

TABLE 1

|  | Buckling around Rod's Diameter | Tearing | Deformation |
|---|---|---|---|
| Example 3 |  |  |  |
| Before heat setting | YES | YES | LARGE |
| After heat setting | NO | NO | SMALL |
| Comparative Example 3 |  |  |  |
| Before heat setting | YES | YES | LARGE |
| After heat setting | YES | YES | LARGE |

Example 4

A rod having a final diameter of 10 mm was produced by repeating Example 3 except that a mold having a nozzle diameter of 11 mm and cylinder diameter of 130 mm was used.

Then, the rod 9 was applied to a door 7 of a hot air oven as shown in FIG. 7 which closes and opens an opening (in the form of a square having a side of 400 mm) of the hot air oven by fitting it into a groove 8 (having an inner side of 420 mm, an outer side of 440 mm and a depth of 6 mm) such that a portion of a rod thickness protruded by 4 mm above a surface of the door. (FIG. 8 shows an enlarged cross-sectional view of the door in which the rod is fitted into the groove.) End surfaces of the rod were joined such as shown within a circle A in FIG. 7.

An extent of closing of the door was such set that the door deformed a thickness of 2 mm of the protruding portion.

The door was closed and then the oven was operated at a hot air temperature of 200° C. and a static pressure of the hot air of 200 mmH₂O for 48 hours. No leakage of the hot air was observed.

The door was opened and again closed, and then the oven was operated. Again, no hot air was leaked.

Comparative Example 4

A rod was produced by repeating Example 4 except that PFA was not blended. Then, the rod was fitted into the groove 8 as in Example 4. However, since a pressed portion when fitted was depressed by more than 2 mm, hot air was leaked from such a portion when the door was closed.

We claim:

1. A polytetrafluoroethylene porous material composed of a polytetrafluoroethylene and a heat-meltable resin which has a melting point lower than that of the polytetrafluoroethylene, said material having fibril portions and node portions wherein the fibril portions are mainly of the polytetrafluoroethylene and the heat-meltable resin mainly constitutes the node portions and hardly constitutes the fibril portions, wherein the heat-meltable resin has a heat resistance to the extent that decomposition and/or foaming does not occur during heat setting treatment, and wherein said heat-meltable resin is selected from the group consisting of tetrafluoroethylene-hexafluoropropylene copolymer, tetrafluoroethylene-perfluoroalkyl vinyl ether copolymer and poly (ether ether ketone).

2. The polytetrafluoroethylene porous material according to claim 1 wherein the material is in the form of a tube.

3. The polytetrafluoroethylene porous material according to claim 1 wherein the material is in the form of a film.

4. The polytetrafluoroethylene porous material according to claim 1 wherein the material is in the form of a rod.

5. A process for the production of a polytetrafluoroethylene porous material comprising extruding a powder suitable for paste-extrusion, said powder comprising particles of a polytetrafluoroethylene produced by emulsion polymerization of tetrafluoroethylene and particles of a heat-meltable resin which has a melting point lower than that of the polytetrafluoroethylene, wherein the extrusion is conducted at a temperature which is not higher than the melting point of the heat-meltable resin optionally followed by rolling so that an unsintered material is obtained, stretching the unsintered material at a temperature which is not higher than the melting point of the heat-meltable resin, and then heat setting the stretched material at a temperature which is equal to or higher than the melting point of the polytetrafluoroethylene, wherein said heat-meltable resin is selected from resins which do not decompose or foam during said heat setting treatment, and wherein said heat-meltable resin is selected from the group consisting of tetrafluoroethylene-hexafluoropropylene copolymer, tetrafluoroethylene-perfluoroalkyl vinyl ether copolymer and poly(ether ether ketone).

6. A sealing member in the form of a rod comprising a polytetrafluoroethylene porous material according to claim 1.

7. The polytetrafluoroethylene porous material according to claim 1, wherein the content of the heat-meltable resin is from 25 to 75% by weight.

8. The process according to claim 5, wherein the content of the heat-meltable resin is from 25 to 75% by weight.

* * * * *